United States Patent
Sugata et al.

(10) Patent No.: US 11,260,643 B2
(45) Date of Patent: Mar. 1, 2022

(54) LAMINATING APPARATUS, AND FILM CASSETTE AND FILM SHAFT USED THEREIN

(71) Applicant: LAMI CORPORATION INC., Osaka (JP)

(72) Inventors: Yoshihisa Sugata, Osaka (JP); Hiromi Matsushita, Osaka (JP); Katsuyoshi Fujiwara, Osaka (JP)

(73) Assignee: LAMI CORPORATION INC., Osaka (JP)

( * ) Notice: Subject to any disclaimer, the term of this patent is extended or adjusted under 35 U.S.C. 154(b) by 189 days.

(21) Appl. No.: 16/304,439

(22) PCT Filed: May 26, 2017

(86) PCT No.: PCT/JP2017/019775
§ 371 (c)(1),
(2) Date: Nov. 26, 2018

(87) PCT Pub. No.: WO2017/204343
PCT Pub. Date: Nov. 30, 2017

(65) Prior Publication Data
US 2019/0143663 A1    May 16, 2019

(30) Foreign Application Priority Data
May 27, 2016  (JP) ................................ 2016-106345

(51) Int. Cl.
*B32B 37/22* (2006.01)
*B32B 37/00* (2006.01)
(Continued)

(52) U.S. Cl.
CPC ............ *B32B 37/226* (2013.01); *B29C 63/02* (2013.01); *B32B 27/10* (2013.01); *B32B 37/0053* (2013.01); *B32B 38/0004* (2013.01)

(58) Field of Classification Search
CPC .............. B32B 37/226; B32B 37/0053; B32B 38/0004; B29C 65/74
See application file for complete search history.

(56) References Cited

U.S. PATENT DOCUMENTS

| | | | |
|---|---|---|---|
| 6,431,243 B1 * | 8/2002 | Ito | B32B 37/226 156/555 |
| 2007/0204961 A1 * | 9/2007 | Nakashima | B32B 37/0046 156/583.1 |

FOREIGN PATENT DOCUMENTS

| | | | | |
|---|---|---|---|---|
| JP | 2001-079940 | | 3/2001 | |
| JP | 2002166474 | * | 6/2002 | ............. B29C 63/02 |

(Continued)

*Primary Examiner* — Mark A Osele
*Assistant Examiner* — Christopher C Caillouet
(74) *Attorney, Agent, or Firm* — Wenderoth, Lind & Ponack, L.L.P.

(57) ABSTRACT

In order to provide a laminating apparatus that enables a film to be loaded in a reliable and easy manner without a complicated structure, a laminating apparatus 1 includes a sheet feed mechanism unit 10, a film cassette 20, and a press-bonding mechanism unit 30 configured to perform thermal press-bonding while sandwiching a sheet with a pair of films. The laminating apparatus 1 also includes an openable/closable upper unit 5, and employs a configuration in which the upper unit 5 is provided with one pressing roller 31 of a pair of pressing rollers of the press-bonding mechanism unit 30, and an upper member of another mechanism for performing a process in a state where the sheet is sandwiched between the films.

12 Claims, 10 Drawing Sheets

(51) Int. Cl.
*B32B 38/00* (2006.01)
*B29C 63/02* (2006.01)
*B32B 27/10* (2006.01)

(56) References Cited

FOREIGN PATENT DOCUMENTS

| | | |
|---|---|---|
| JP | 2004-243659 | 9/2004 |
| JP | 2006-15516 | 1/2006 |

* cited by examiner

[FIG.1]
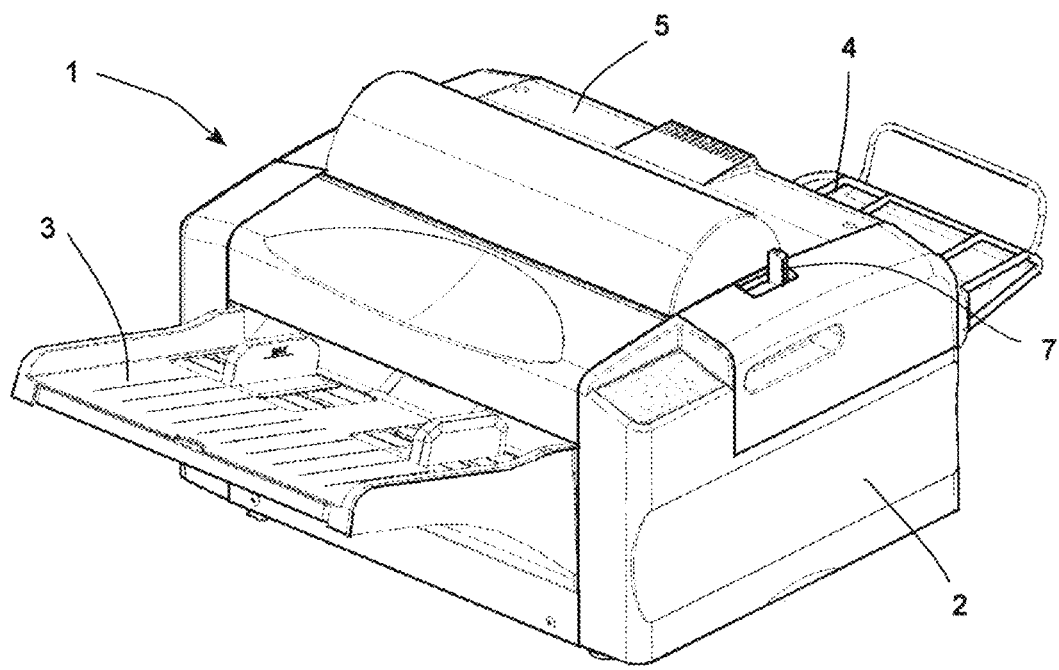

[FIG.2]
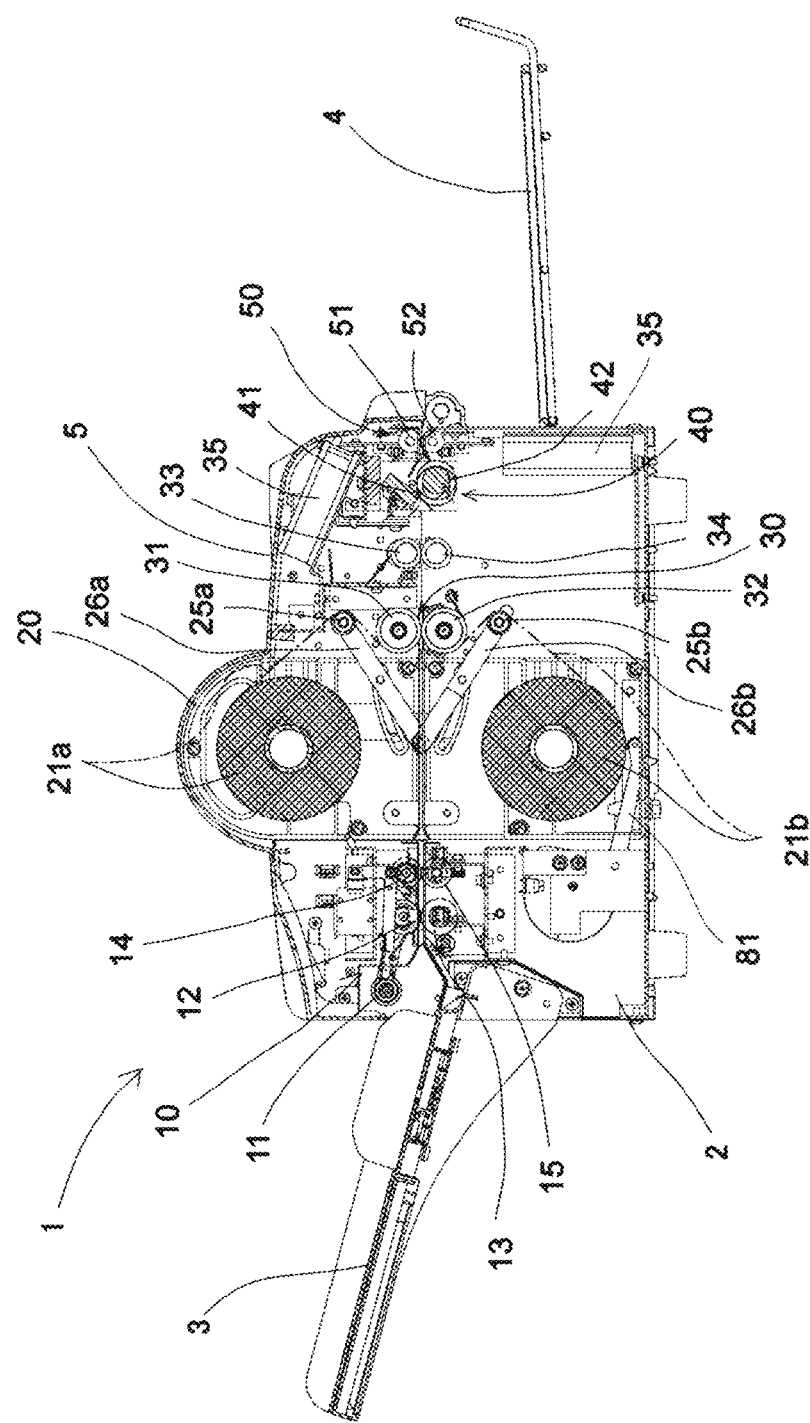

[FIG.3]
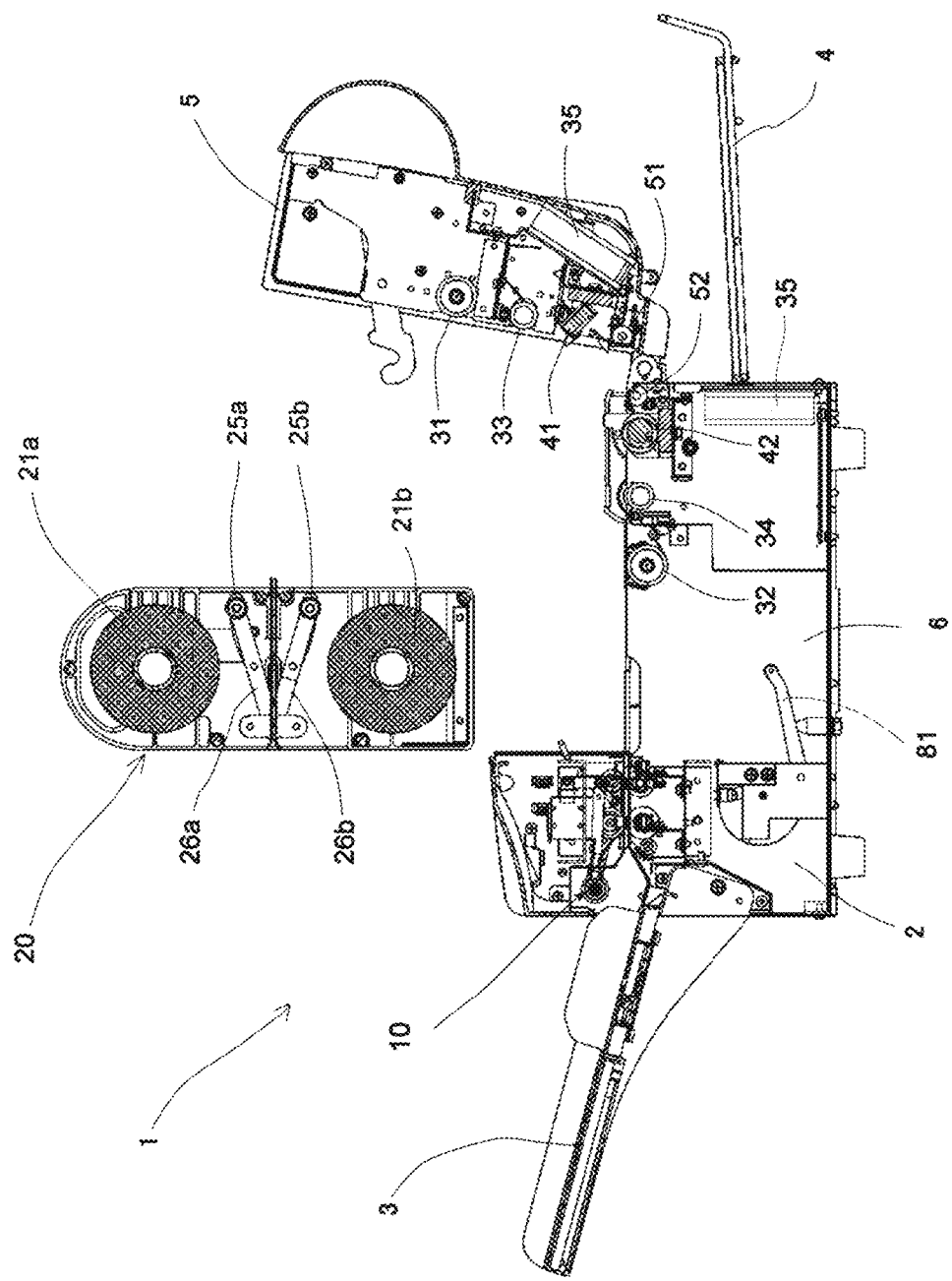

[FIG.4]
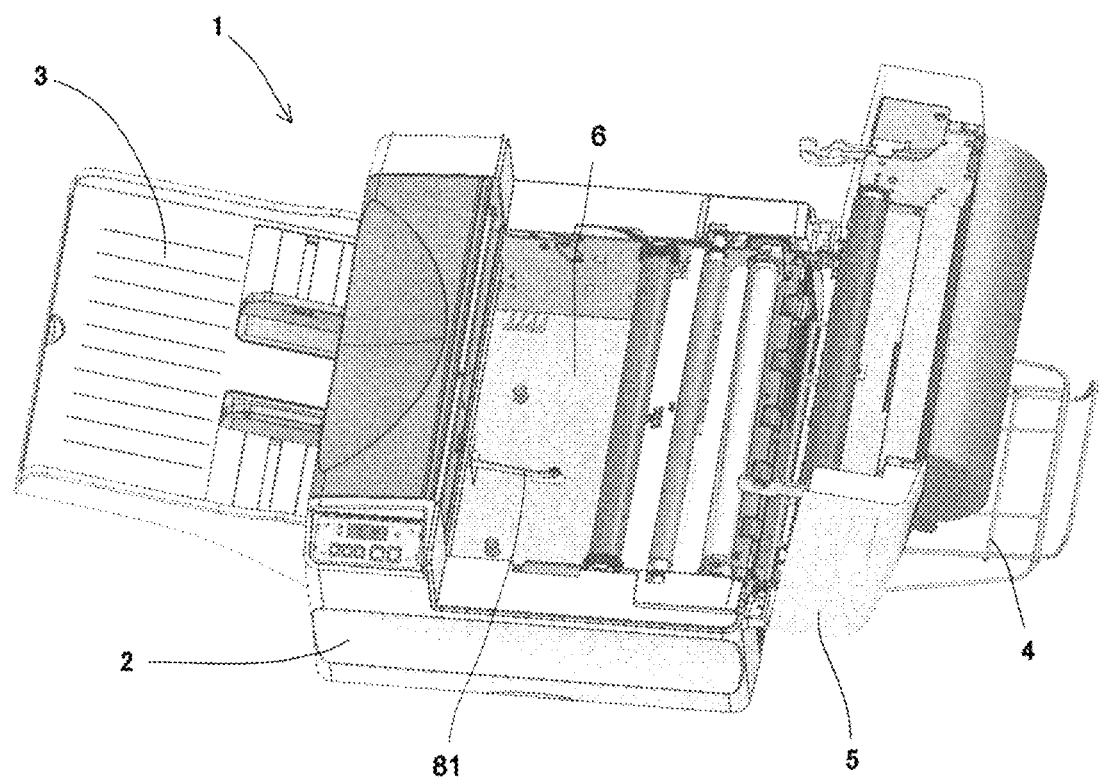
[FIG.5]
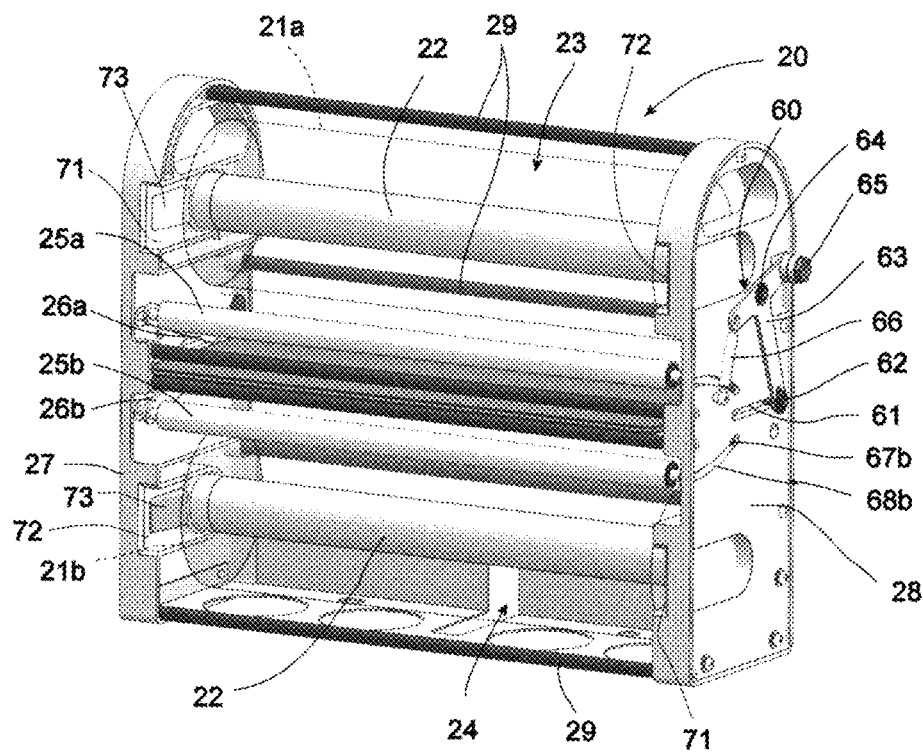

[FIG.6]
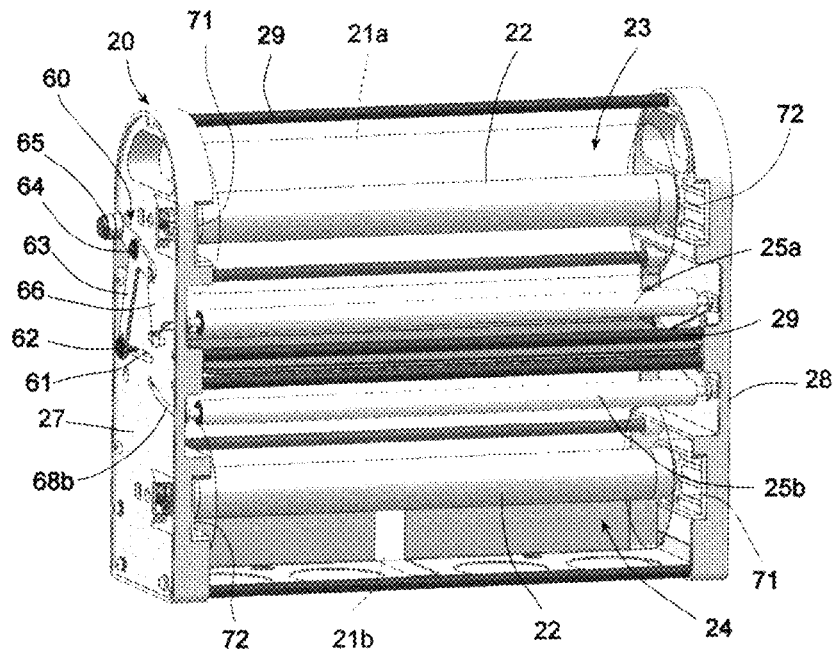
[FIG.7]
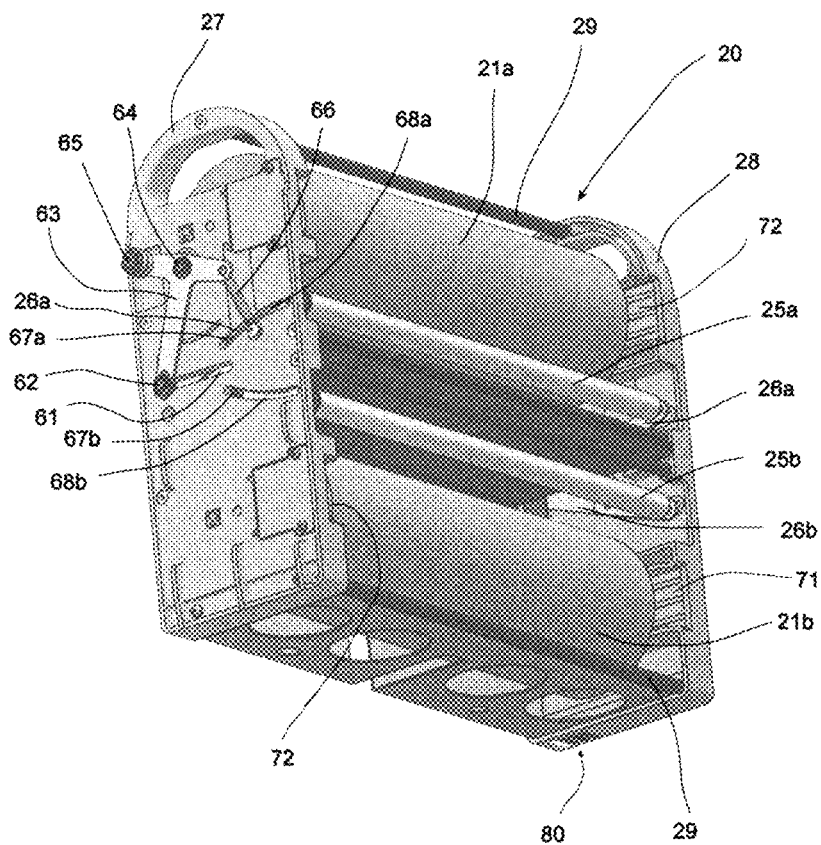

[FIG.8]
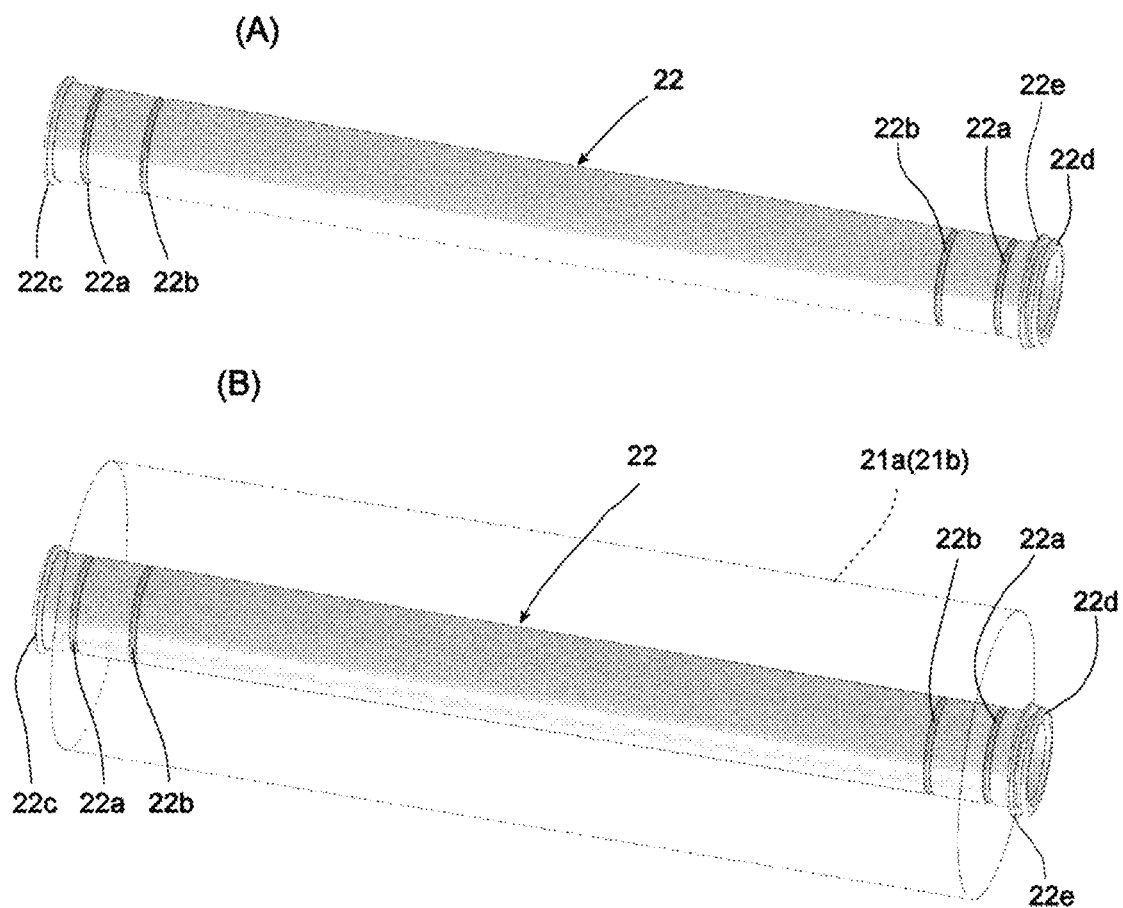

[FIG.9]
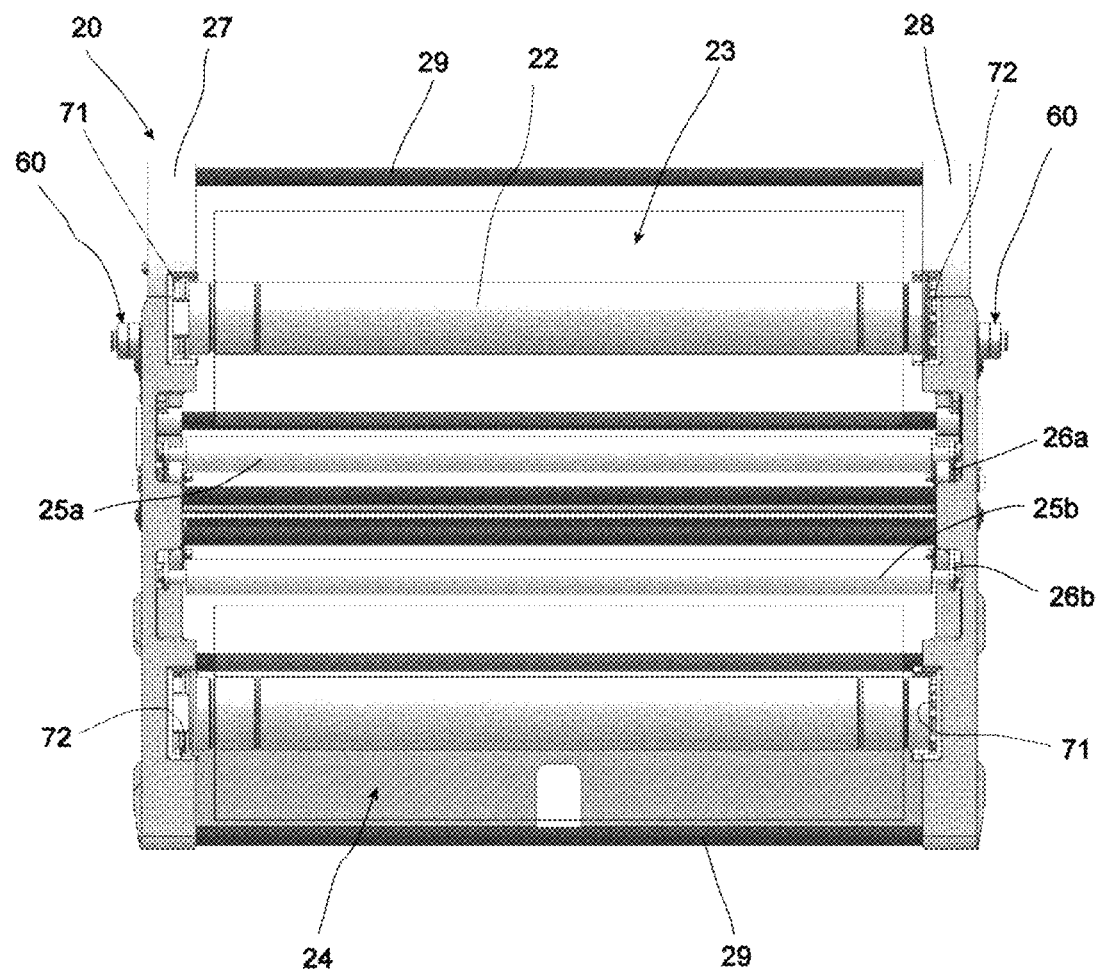
[FIG.10]
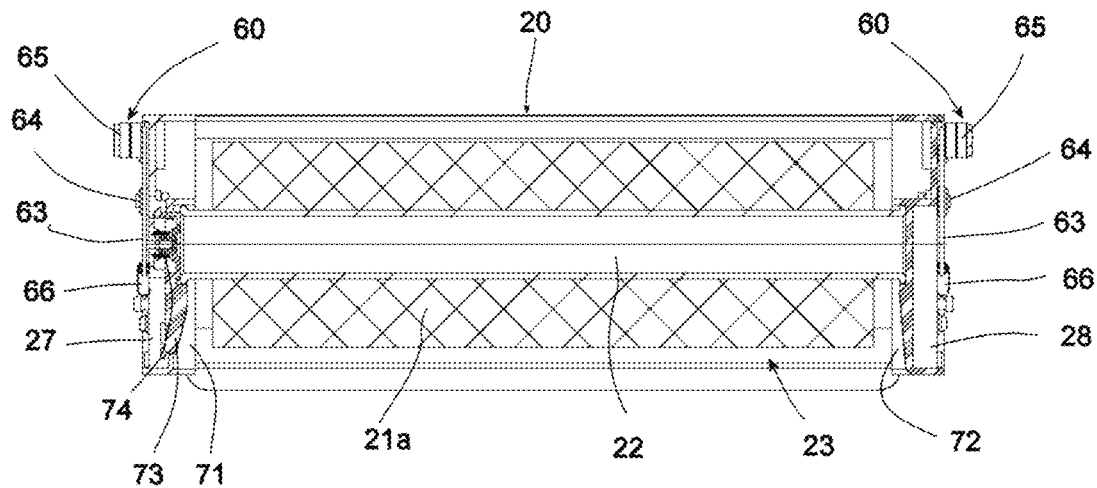

[FIG.11]
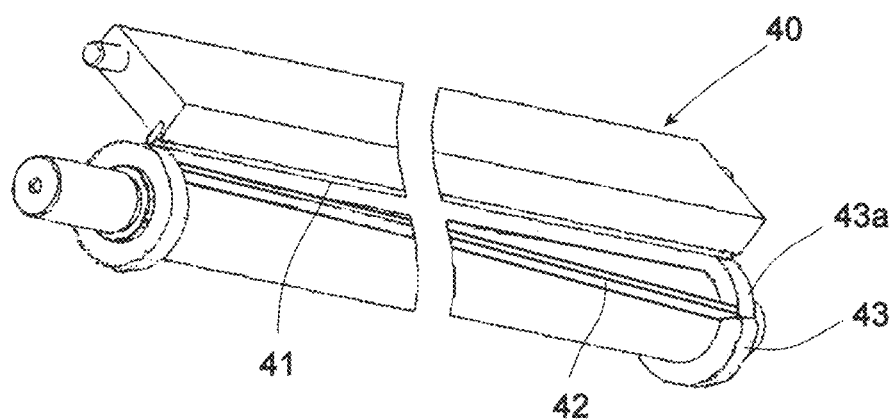

[FIG.12]
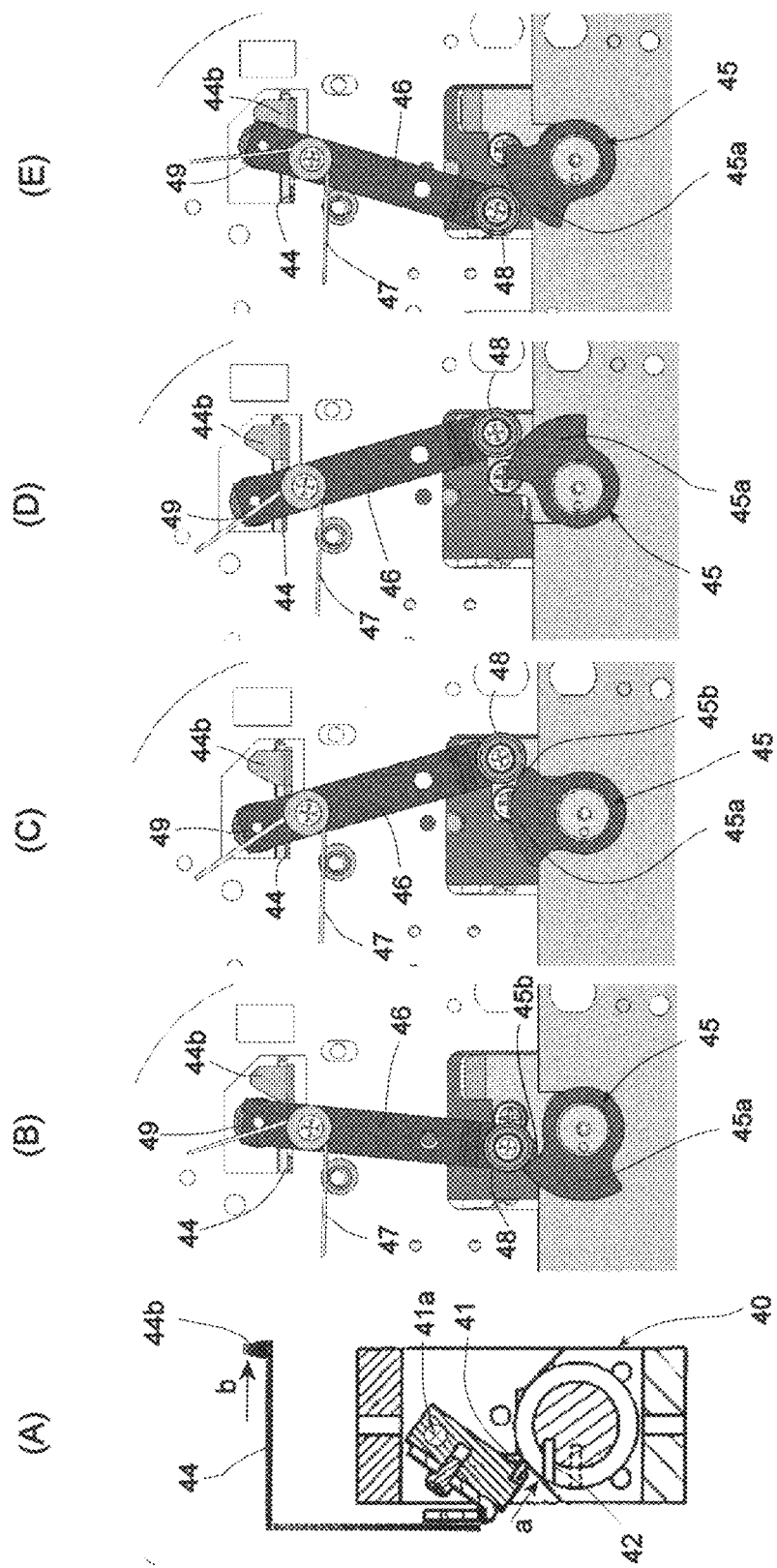

[FIG.13]
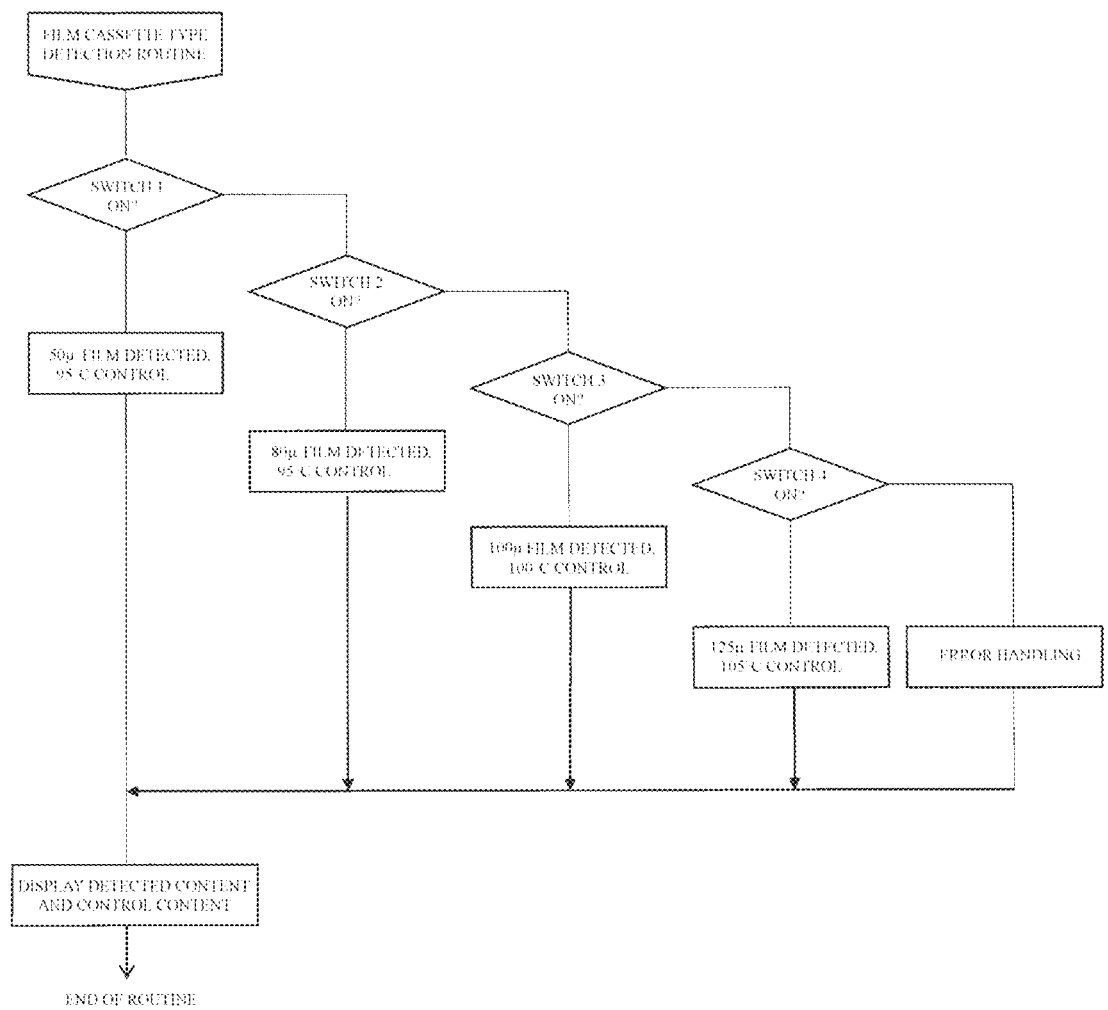

LAMINATING APPARATUS, AND FILM CASSETTE AND FILM SHAFT USED THEREIN

TECHNICAL FIELD

The present invention relates to a laminating apparatus used for a laminating process for a purpose of improving durability and water resistance of various types of paper. More particularly, the present invention relates to a laminating apparatus that enables laminate films to be loaded easily by means of a cassette system, and to a film cassette and a film shaft used therein.

BACKGROUND ART

For the purpose of improving durability and water resistance of various kinds of paper such as cards including business cards and restaurant menu, a laminating process is carried out by sandwiching both sides of paper with sheets of synthetic resin films. A laminating apparatus which enables the laminating process to be performed automatically has been conventionally used.

There are various structures of laminating apparatuses. Among them, there is one in which a synthetic resin film for lamination (hereinafter simply referred to as "film") is stored in a cassette separated from a main body of the laminating apparatus, and the cassette is installed in the main body of the laminating apparatus as required, so that the film is replaced easily (for example, Patent Literature 1).

However, in the laminating apparatus using a cassette system of Patent Literature 1 as described above, although it is easy to replace a film, it is necessary to perform an operation of letting a tip end portion of the film pass through to a predetermined position such as winding the film around a pressing roller in the main body of the laminating apparatus. Such an operation is difficult without experience.

Further, it is not enough to simply draw out a film, taken out of the cassette, to a pressing roller. The film is not sufficiently heated by the pressing roller unless the film is wound around the pressing roller at a certain angle, and the laminating process becomes insufficient. Accordingly, it is necessary that a film traveling path from the cassette to the pressing roller takes a path that returns to the pressing roller after passing over the pressing roller, to thereby take a large winding angle to the pressing roller.

Therefore, it is proposed that by providing a position-movable guide roller and guiding a film to a laminating roller for thermal press-bonding via the guide roller, the film is wound around a larger number of laminating rollers so that the film can be sufficiently heated (for example, see Patent Literature 2).

In addition, a laminating apparatus in which a mechanism for press-bonding a sheet or film for lamination by sandwiching the sheet or film, and conveying and cutting the sheet or film can be divided into upper and lower units that sandwich a lamination target object, to thereby facilitate setting of a film and the like (tor example, see Patent Literature 3).

CITATION LIST

Patent Literature 1: JP 2001-79940 A
Patent Literature 2: JP 2006-015516 A
Patent Literature 3: JP 2004-243659 A

SUMMARY OF INVENTION

Technical Problems

As described above, when a film as described in Patent Literature 1 is stored in a cassette, it is easy to install the cassette. However, it is complicated to successfully guide the film from the cassette into the apparatus and to set the film into the apparatus thereafter. In particular, in order to wind a film at a sufficient angle around a roller for a laminating process as described in Patent Literature 2, a movable mechanism for a guide roller is required. This makes the structure complicated, and causes a cost increase. Further, it is necessary to move the guide roller by a lever or the like. Therefore, there is a problem that if a position change of the guide roller is forgotten, a defective product may be generated.

Further, in a case of an apparatus that can be divided into upper and lower units that sandwich a lamination target object as described in Patent Literature 3, a film can be loaded relatively easily. However, when consideration is given to a cutter section having a cutting mechanism using upper and lower cutters, the cutter section is not separable, so that the film needs to be passed through it. Accordingly, it cannot be said that loading of the film is easy.

Besides, in the lamination process, handling of the film is difficult, and as the film speed for pulling out increases, the film becomes wrinkled or caught in the apparatus, so that a film feed brake is required. However, there arises a problem that it is difficult to locate a complicated braking mechanism in a film cassette and cost is increased.

Also, in the laminating process, it is necessary to change a condition of the laminating process according to a thickness and a type of a film to be used. As such, even though the type of the film is changed by a simple operation such as changing of a film cassette, if a process is performed without setting a lamination condition for the film, there is a problem that the laminating process fails.

Further, failures that an attempt is made to perform a laminating process without installing a cassette and that a process is continued without being aware that the film runs out even though the cassette is installed have been made. Also, in order to prevent such failures, a product of detecting that a film runs out by processing the film is commercialized. In that case, however, there is a problem that a cost is required for processing the film.

As described above, in a laminating apparatus of a film cassette replaceable type, although replacement and setting of a film are easy, it is difficult to arrange the film thereafter. Further, in an attempt to sufficiently wind the film around a pressing roller for lamination to achieve a stable laminating process or to achieve appropriate braking for film feeding, there is a problem that a structure becomes complicated and a cost for the apparatus increases. Furthermore, there is also a problem that although replacement of a film is easy, there is a possibility of a failure in a laminating process caused by an erroneous setting of a film or forgetting to set a film.

An object of the present invention is to solve the problems as described above, and to provide a laminating apparatus in which a film is replaced using a cassette system and provide related components thereof, the laminating apparatus having a simple structure and enabling a film to be loaded reliably and easily, solving a problem of sufficient winding of a film around a pressing roller and a problem of a film feed brake as described above, realizing easy installation of a film without damaging components, and preventing a failure in a laminating process due to erroneous settings or erroneous recognition.

Solution to Problems

In order to solve the aforementioned problems, a first aspect of the invention is a laminating apparatus including a sheet feed mechanism unit configured to convey a sheet to be laminated into an apparatus main body, a film cassette in which a pair of films for lamination is accommodated, the film cassette being detachable from the apparatus main body, and a press-bonding mechanism unit configured to perform a laminating process through thermal press bonding while sandwiching the sheet with the pair of films delivered from the cassette in the apparatus main body. The apparatus main body includes an upper unit of an openable and closable type, and the upper unit is provided with one pressing roller of a pair of pressing rollers for press-bonding in the press-bonding mechanism unit, and an upper member of another mechanism for performing a process in a state where upper and lower sides of the sheet is sandwiched between the pair of films.

The second aspect of the invention employs a configuration that in the laminating apparatus according to the first aspect, in the film cassette, a film is wound around a pair of film shafts pivotally supported in a rotatable manner at upper and lower positions across a conveying path of the sheet when the film cassette is installed in the apparatus main body, and that the film cassette is installed by being fitted downward from above the apparatus main body.

The third aspect of the invention employs a configuration that in the laminating apparatus according to the second aspect, the film includes a pair of idle rollers projectable and retractable in an up and down direction of the press-bonding mechanism unit in the apparatus main body from a side of the film shaft.

The fourth aspect of the invention employs a configuration that in the laminating apparatus according to the third aspect, each of the pair of idle rollers is pivotally supported by end portions of a pair of roller arms, and when the film cassette is installed in the apparatus main body, one ends of the roller arms are projectable and retractable from an inside of the film cassette into the apparatus main body.

The fifth aspect of the invention employs a configuration that in the laminating apparatus according to the fourth aspect, the pair of idle rollers protrudes according to an operation of closing the upper unit, and retracts according to an operation of opening the upper unit.

The sixth aspect of the invention employs a configuration that in the laminating apparatus according to the fourth aspect, after the upper unit is closed, the pair of idle rollers protrudes according to an operation of a pressure lever to apply pressure to the press-bonding mechanism unit, and retracts according to an operation of releasing the pressure lever.

The seventh aspect of the invention employs a configuration that the laminating apparatus according to any one of the first to sixth aspects further includes a rotary cutter unit provided behind the press-bonding mechanism unit, the rotary cutter unit being configured to sandwich a sheet, to which the laminating process is applied, between a fixed blade and a rotary blade and cut the sheet in a width direction, and a mechanism configured to, when the rotary blade is located at a rotary position at which the rotary blade abuts against the fixed blade at a time of closing a cover of an openable and closable type, separate positions of the rotary blade and the fixed blade from each other, and when the rotary blade rotates in a state where the cover of the openable and closable type is closed, return the rotary blade and the fixed blade to original positions.

The eighth aspect of the invention employs a configuration that in the laminating apparatus according to any one of the first to seventh aspects, a speed of a conveyance roller that conveys the sheet while sandwiching the sheet in the sheet feed mechanism unit is switched between two speeds including a high speed and a low speed, so that a space between a preceding sheet and a subsequent sheet is made constant.

The ninth aspect of the invention employs a configuration that the laminating apparatus according to any one of the first to eighth aspects further includes a film identifying unit capable of being set to an appropriate state according to a type and size of a film loaded to the film cassette, wherein a state of the film identifying unit is recognized by the apparatus main body and a laminating process is performed according to the type and size of the film.

The tenth aspect of the invention employs a configuration that the laminating apparatus according to any one of the first to ninth aspects further includes a film detection sensor provided to the apparatus main body, the film detection sensor being energized to be brought into contact with a surface of a film wound around the film shaft in the film cassette installed in the apparatus main body to detect a position of the surface of the film, wherein a remaining amount of the film is detected by the film detection sensor.

The eleventh aspect of the invention employs a configuration that in the laminating apparatus according to the tenth aspect, the film detection sensor also serves to detect whether or not the film cassette is installed.

The twelfth aspect of the invention is a film cassette provided to a laminating apparatus in a detachable manner, the laminating apparatus including a sheet feed mechanism unit configured to convey a sheet to be laminated into a main body of the laminating apparatus and a press-bonding mechanism unit configured to perform a laminating process through thermal press bonding while sandwiching the sheet between a pair of films in the apparatus main body. The film cassette is configured to deliver the pair of films to be fed to the press-bonding mechanism unit in a state where the pair of films is wound around film shafts. The pair of films is provided to upper and lower film folders in a state where each of the pair of films is wound around each film shaft, and shapes of parts pivotally supporting the film shaft differ in right and left and are reversed in right and left between the upper and lower film holders.

The thirteenth aspect of the invention employs a configuration that in the film cassette according to the twelfth aspect, energization is applied in an axial direction of the film shaft from a side of the film cassette to the film shaft to thereby provide a braking force for rotation of the film shaft.

The fourteenth aspect of the invention employs a configuration that the film cassette according to the twelfth or thirteenth aspect further includes a pair of idle rollers that is projectable and retractable from a side of the film shaft in an up and down direction of the press-bonding mechanism unit of the main body of the laminating apparatus.

The fifteenth aspect of the invention is a film shaft that holds a film for lamination, the film being wound around the film shaft, to supply the film to a laminating apparatus. An end portion of the film shaft has a diameter larger than a diameter of a shaft portion, and a shape in a vicinity of a right end and a shape in a vicinity of a left end differ from each other.

The sixteenth aspect of the invention employs a configuration that in the film shaft according to the fifteenth aspect, a surface of the film shaft has markings in a dented shape, the markings being provided at an interval of a width of various types of standard-size paper.

Advantageous Effects of Invention

As described above, according to the first aspect of the invention, since the upper side of the mechanism sandwiching the laminated object, including the pressing roller of the press-bonding mechanism unit, the pull roller, and the like, is provided to the upper unit side that opens upward, it is unnecessary to pull out a film to pass the film through a complicated mechanism part. Further, film setting is simplified, and an access to the internal mechanism at the time of failure is also easy. Therefore, maintainability is improved.

According to the second aspect of the invention, since loading of the film into the laminating apparatus requires only a simple operation of fitting, into the apparatus, a separate film cassette in which the film is loaded, it is easy to load the film into the apparatus.

According to the third aspect of the invention, since the idle roller protrudes into the apparatus main body, the film is sufficiently wound around the pressing roller of the press-bonding mechanism unit by passing through the idle roller. This prevents a defective from being produced due to insufficient heating of the film. Further, it is unnecessary to manually load the film along a film path, whereby the operation is simplified.

According to the fourth aspect of the invention, since the protruding and retracting mechanism of the idle roller is provided by protruding and retracting of the roller arm provided to the film cassette side, no complicated mechanism is required on the apparatus main body side. This makes the structure simple, and realizes cost reduction.

According to the fifth aspect of the invention, since the idle roller protrudes and retracts according to the operation of closing and opening the upper unit, the setting operation is simplified. Further, it is possible to prevent a problem of removing the film cassette while forgetting to retract the idle roller to the film cassette side. Furthermore, at the time of installing and removing the film cassette, as the upper unit is already opened and the idle roller is stored in the film cassette, it is possible to prevent mechanical interference and a failure.

According to the sixth aspect of the invention, since the idle roller protrudes and retracts according to the operation of the pressure lever, the setting operation is simplified. Further, it is possible to prevent a problem of removing the film cassette while forgetting to retract the idle roller to the film cassette side. Furthermore, when the pressure lever is operated in a pressure releasing direction to open the upper unit, the idle roller is stored in the film cassette, so that mechanical interference and a failure can be prevented.

According to the seventh aspect of the invention, opening of the upper unit also makes it easy to mount the film even on the cutter unit. Also, when closing the upper unit, even if the rotary blade is not stopped at a predetermined position, it never hits the fixed blade. Therefore, the blades do not collide with each other and are not damaged, and general cutting work can be continued by rotation of the rotary blade.

According to the eighth aspect of the invention, by switching the speed of the transporting roller, it is possible to change the transport speed of the preceding and succeeding sheets. Accordingly, by setting the speed of the subsequent sheet higher than the speed of the preceding sheet to shorten the interval between the trailing end of the preceding sheet and the leading end of the subsequent sheet to make the interval constant and conveying the sheets at the same speed, for example, and then performing the laminating process, the sheet interval is kept at an appropriate constant interval, so that waste of the film after cutting is not caused.

According to the ninth aspect of the invention, by setting, to the identifying unit, a condition optimal for a laminating process of a film in the film cassette according to the thickness of the film, the kind of material, and the like, the apparatus can automatically determine an optimum condition for lamination to perform a laminating process. Therefore, when the film is replaced, changing of the setting condition is never be forgotten, which prevents a failure in the laminating process.

According to the tenth aspect of the invention, it is possible to detect an end of the film in the cassette, and to prevent a failure in the laminating process by issuing a warning in a state where the film is about to run out or stopping the laminating process. Further, it is unnecessary to set an end portion in advance by, for example, attaching a black film to the film end portion, as in a conventional case.

According to the eleventh aspect of the invention, a detection sensor for detecting the end of the film in the cassette can also be used to detect a state where there is no film cassette (no film is loaded) to thereby issue a warning or stop the laminating process. This prevents a failure in the laminating process, and leads to simplification and cost reduction of the apparatus when the sensor is used in combination.

According to the twelfth aspect of the invention, the film wound around the film shaft can be loaded to the film cassette with no error in the directionality. Further, since the direction of the film shaft is changed in up and down, the film is automatically reversed in up and down at the time of loading. Therefore, the directionality of the film wound around the film shaft can be unified, and the film winding operation on the film shaft becomes easy.

According to the thirteenth aspect of the invention, the braking force of the shaft is obtained with a simple structure such as energizing the shaft in the axial direction. Therefore, a complicated braking device is not required and the cost is reduced.

According to the fourteenth aspect of the invention, since the idle roller protrudes into the apparatus main body, the film is sufficiently wound around the pressing roller of the press-bonding mechanism unit by passing through the idle roller. This prevents a defective from being produced due to insufficient heating of the film. Further, it is unnecessary to manually load the film along a film path, whereby the operation is simplified.

According to the fifteenth aspect of the invention, since the end portion of the shaft around which the film is wound has a large diameter, the frictional force at the time of rotation of the shaft becomes large, so that the breaking force to prevent wrinkles at the time of delivering the film and to prevent rolling into the apparatus can be obtained more easily. Further, the right and left shapes in the vicinity of the end portion of the shaft differ from each other, so that it is possible to prevent a failure in the laminating process due to an error in a loading direction of the film.

According to the sixteenth aspect of the invention, since a position of the film when it is wound around the shaft can be determined by the markings, it is not necessary to adjust the position of the film in the width direction at the time of lamination. Further, the markings are in a dented shape, so that there is no obstacle when a film having a larger width is wound thereon.

BRIEF DESCRIPTION OF DRAWINGS

FIG. 1 is a perspective view of a laminating apparatus of the present invention.

FIG. 2 is a side sectional view of the laminating apparatus of the present invention.

FIG. 3 is a side sectional view illustrating a state in which an upper unit of the laminating apparatus of the present invention is opened and a film cassette is taken out.

FIG. 4 is a perspective view illustrating a state in which the upper unit of the laminating apparatus of the present invention is opened.

FIG. 5 is a perspective view of a film cassette.

FIG. 6 is a perspective view of a film cassette.

FIG. 7 is a perspective view of a film cassette.

FIG. 8(A) is a perspective view of a film shaft, and FIG. 8(B) is a perspective view of a state where a film is wound.

FIG. 9 is a rear view of a film cassette.

FIG. 10 is a plan sectional view of a film cassette.

FIG. 11 is a perspective view of a structure of a rotary cutter unit.

FIG. 12(A) is a side sectional view illustrating a structure of the rotary cutter unit, and FIGS. 12(B), 12(C), 12(D) and 12(E) are side sectional views illustrating a retracting structure of a rotary blade.

FIG. 13 is a chart illustrating a laminating process condition according to types of films.

DESCRIPTION OF EMBODIMENTS

Embodiments of the present invention will be described below with reference to the accompanying drawings.

A laminating apparatus 1 of the present invention has a structure as illustrated in FIGS. 1 to 4. A sheet feed tray 3 is provided to a front side of an apparatus main body 2, and an output tray 4 is provided to a rear side thereof. The sheet feed tray 3 is used for stacking sheets to be laminated.

As illustrated in FIG. 3, the apparatus main body 2 is configured such that an upper unit 5 is separable and openable, and the apparatus main body 2 and an internal mechanism provided below the upper unit 5 are reachable by hand so that operation such as film loading can be performed. Further, a film cassette 20 containing films for lamination, as illustrated in FIGS. 5 to 7, is provided detachably so as to be removable upward from the apparatus main body 2.

First, at a time of starting a sheet feeding operation, a sheet is drawn into the main body using a draw-in roller 11 of a sheet feed mechanism unit 10 from sheets stacked on the sheet feed tray 3. The draw-in roller 11 is lowered from above a sheet onto a surface of the sheet by an operation of a sheet feed solenoid. Note that the draw-in roller 11 is operated by receiving a drive force from a main motor via a sheet feed clutch.

When a sheet feeding operation is performed, the draw-in roller 11 is brought into contact with the surface of the sheet by the operation of the sheet feed solenoid, and the main motor and the sheet feed clutch are operated to rotate the draw-in roller 11, whereby the sheet is drawn into the sheet feed mechanism unit 10 in the apparatus main body 2.

The sheet drawn into the sheet feed mechanism unit 10 by the draw-in roller 11 is separated by a pair of rollers including an upper sheet feed roller 12 and a lower separation roller 13 (rotating in an opposite direction to the upper sheet feed roller 12). Even if a plurality of sheets are sent, only the top sheet is sent to a rear side of these rollers. In other words, the sheets other than the target one is drawn back to the sheet feed tray 3 side.

The upper sheet feed roller 12 and the lower separation roller 13 are pressed against each other with a predetermined pressure by a spring mechanism. Further, the lower separation roller 13 has a torque limiter built therein. In a state where only one sheet is interposed, the lower separation roller 13 rotates in a forward direction while overcoming the torque limiter.

The rotation of the upper sheet feed roller 12 starts rotation at the same timing as start of rotation of the draw-in roller 11, and after a sheet reaches conveyance rollers 14 and 15 provided behind, the rotation is stopped. The lower separation roller 13 also operates at the same timing as the draw-in roller 11. It should be noted that rotation of the upper sheet feed roller 12 and the draw-in roller 11 is driven by the main motor.

The conveyance rollers 14 and 15 send a sheet sent from the upper sheet feed roller 12 to a press-bonding mechanism unit 30 provided behind, for press-bonding the sheet with a film fed from the film cassette 20.

The conveyance roller 14 on the upper side is driven by the main motor via the sheet feed clutch and rotates, and the lower conveyance roller 15 is in pressure contact with the conveyance roller 14 on the upper side by a spring mechanism to thereby rotate following the conveyance roller 14 on the upper side.

The conveyance roller 14 on the upper side is driven by the main motor that drives the upper sheet feed roller 12 via a clutch, but is also driven via a conveyance clutch (electromagnetic clutch).

The mechanism is configured such that when the conveyance clutch is connected, conveyance is performed at a high speed, while when the conveyance clutch is released, conveyance is performed at a low speed that is the same as a speed of the pressing rollers 31 and 32 of the press-bonding mechanism unit 30 described below.

In the case of sending two or more sheets in succession for a laminating process, when the conveyance rollers 14 and 15 are started to feed the subsequent sheet, the conveyance clutch is connected to rotate the rollers at a high speed to thereby make an interval between the leading edge of the subsequent sheet and the trailing edge of the preceding sheet close to each other have a predetermined distance. After reaching the predetermined distance, the conveyance clutch is released and low-speed conveyance is performed at the same speed as that of the preceding sheet.

The sheet feed mechanism unit 10 has a structure as described above, so that the interval between the preceding sheet and the subsequent sheet is shortened. When they have a constant interval, the sheet can be laminated after being conveyed at the same speed, and the interval between the sheets is kept at an appropriate constant interval. Accordingly, there is no waste of film after cutting.

On the other hand, in order to perform a laminating process, there is a mechanism that upper and lower films 21*a* and 21*b* that sandwich the sheet are fed from respective film holders 23 and 24 in the cassette 20 via idle rollers 25*a* and 25*b*, and are wound on the pressing rollers 31 and 32 of the press-bonding mechanism unit 30. Then, glue on the surfaces of the films is melted, and the films are press-bonded onto the sheet.

Each of the pressing rollers 31 and 32 has a quartz tube heater built therein, and temperature control is performed by detecting a temperature of the roller surface. Control is made such that when a temperature lower than a predetermined temperature is detected, the quartz tube heater is electrified, while when a temperature exceeding the predetermined temperature is detected, electrification of the quartz tube heater is stopped.

In addition, the pressing rollers 31 and 32 and pull rollers 33 and 34 have a mechanism of applying pressure by upper and lower roller pairs, respectively. The pressure can be switched between pressurization and depressurization by closing the upper unit 5 and reciprocating left and right pressure levers 7 and 7 in a pair between predetermined positions.

A sheet from the sheet feed mechanism unit 10 is sent between the films 21a and 21b sent from the film cassette 20, and is press-bonded with the films 21a and 21b by the pair of pressing rollers 31 and 32 of the press-bonding mechanism unit 30.

Further, cooling fans 35 and 35 are provided above and below the pull rollers 33 and 34. The films 21a and 21b, after being press-bonded by the pressing rollers 31 and 32, are cooled to improve finishing quality of lamination.

The press-bonded laminated object is sent between the pair of pull rollers 33 and 34 behind the pressing rollers 31 and 32, and is further sent to a rotary cutter unit 40 behind them. A structure of the rotary cutter unit 40 is as illustrated in FIG. 11. In the rotary cutter unit 40, a rear end edge of the laminated object is allowed to pass through between upper and lower blades that are a rotary blade 42 and a fixed blade 41 in the rotary cutter unit 40, and the fixed blade 41 is lowered so as to cut an intermediate portion between the trailing end of the previous sheet the leading end of the subsequent sheet and sandwich the cut portion with the rotary blade 42, and then the rotary blade 42 is rotated to cut a laminated portion of the films 21a and 21b. Excessive laminated portions of the films 21a and 21b at a leading end portion of a first object and a trailing end portion of a last object are also cut in the same manner as the above method.

The rotary blade 42 is driven by the main motor, and when the film reaches a predetermined portion to be cut via a stepping clutch therebetween, the stepping clutch is connected and driven for a predetermined time to perform control to rotate the rotary blade 42 by one turn. The fixed blade 41 and the rotary blade 42 sandwich the film only when the film is to be cut. At other times, a gap is left between the fixed blade 41 and the rotary blade 42 so as to allow the laminated object to pass thorough.

As such a means, first, the fixed blade 41 is energized in a direction of being brought into contact with the rotary blade 42 by a spring not illustrated. An end portion of the fixed blade 41 is brought into contact with a cam 43 provided at one end of the rotary blade 42. A portion where the rotary blade 42 overlaps the fixed blade 41 is used as a cam recessed portion 43a having a smaller diameter. Only when the fixed blade 41 is in contact with the cam recessed portion 43a, the fixed blade 41 comes into contact with the rotary blade 42 to cut the film, and in other portions, the fixed blade 41 is separated from the rotary blade 42 against the force of the spring by the cam 43. With this configuration, by only controlling the rotation of the rotary blade 42 at a predetermined position, a cutting operation and passage for conveyance of a laminated object are allowed.

The cut laminated object is discharged to an outside of the apparatus main body 2 by discharge rollers 51 and 52 of a discharge unit 50, and is stored on the output tray 4.

Procedures of a method of performing a laminating process with use of the laminating apparatus 1 have been described briefly. Next, the film cassette 20 to be installed in the laminating apparatus 1, and a film shaft 22 which is to be mounted on the film cassette 20 and on which each of the films 21a and 21b is wounded, will be described.

As illustrated in FIGS. 5 to 7, the film cassette 20 is configured such that cassette frames 27 and 28 on both sides are connected with use of a plurality of crossbars 29 so as to store the films 21a and 21b therein.

As illustrated in FIGS. 2 and 3, the film cassette 20 has a mechanism that it is easily installable in and removable from the apparatus main body 2 by opening the upper unit 5 of the laminating apparatus 1.

In the case of installing the cassette 20, it is installed in the laminating apparatus 1 by holding upper portions of the left and right cassette frames 27 and 28 of the cassette 20 and inserting it from above the apparatus main body 2 into a below storage recess portion 6.

In this state, ends of the upper and lower films 21a and 21b are drawn to cause leading ends thereof to reach the outside of the laminating apparatus 1 from between the upper and lower discharge rollers 51 and 52.

At this time, when setting the film, since the pressing roller 31 in the press-bonding mechanism unit 30, the pull roller 33, the fixed blade 41 in the rotary cutter unit 40, and the like are provided to the upper unit 5 side, when the upper unit 5 is opened, the pressing roller 31, the pull roller 33, the fixed blade 41, and the discharge roller 51, provided to the upper unit 5 side, are separated from the pressing roller 32, the pull roller 34, the rotary blade 42, and the discharge roller 52 that are provided to the apparatus main body 2 side located below them, respectively (see FIG. 3).

Therefore, at the time of setting films, there is no need to allow the films to pass through between the pressing rollers 31 and 32 of the press-bonding mechanism unit 30 and between the pull rollers 33 and 34, and to pass through between the upper and lower blades (the fixed blade 41 and the rotary blade 42) of the rotary cutter unit 40. This makes it easy to load the films into the laminating apparatus 1.

When the upper and lower films 21a and 21b are set in a state where the leading ends thereof are joined, it is possible to load the films more easily.

When the upper unit 5 of the laminating apparatus 1 is closed and the left and right pressure levers 7 and 7 are moved to predetermined positions, pressure is applied between the rollers such as the pressing rollers 31 and 32 and the pull rollers 33 and 34, whereby preparation for the laminating process is completed.

When the upper unit 5 is closed, the pair of pressing rollers 31 and 32 of the press-bonding mechanism unit 30 and the pair of pull rollers 33 and 34 are joined together, the discharge rollers 51 and 52 of the discharge unit 50 are also joined together, and further, the fixed blade 41 and the rotary blade 42 of the rotary cutter unit 40 are also joined together. However, the hard fixed blade 41 and the hard rotary blade 42 may be damaged if they collide with each other due to an operation of closing the upper unit 5.

Therefore, in the case where a rotational stop position of the rotary blade 42 is in a colliding positional relation with the fixed blade 41 when the upper unit 5 is closed, a mechanism for retracting the fixed blade 41 from the rotary blade 42 is provided.

FIG. 12(A) is a side view of the rotary cutter unit 40 illustrated in FIG. 11. The rotary cutter unit 40 is configured of the fixed blade 41 and the rotary blade 42, and rotates the rotary blade 42 in a clockwise direction while conveying the laminated object to thereby cut the laminated object in a width direction. The fixed blade 41 is pressed against the rotary blade 42 with a spring mechanism in the direction of an arrow "a" around the fulcrum 41a. By rotating the rotary blade 42 by about ⅙ after starting cutting of one end of the laminated object, the laminated object is cut up to the other end.

When the cutting is completed, the fixed blade 41 is retracted from the passing position of the laminated object by the cam mechanism including the cam 43 fixed to the end of the rotary blade 42 illustrated in FIG. 11. Note that the fixed blade 41 has a mechanism that it returns to a laminated object passing position by the cam mechanism including the cam 43 immediately before cutting the laminated object and is in pressure contact with the rotary blade 42. Further, when a protruding portion 44b of a fixed blade control arm 44 fixed to the fixed blade 41 is energized in a direction of an arrow b, the fixed blade 41 can be separated from the rotary blade 42 against the spring mechanism.

FIGS. 12(B) to 12(E) are side views of a mechanism in which when the fixed blade 41 and the rotary blade 42 illustrated in 12(A) are in a positional relationship in which the rotary blade 42 collides with the fixed blade 41 at the rotation stop position when the upper unit 5 is closed, the fixed blade 41 is temporarily retracted from the rotary blade 42 and then returns it from a retracted state by a subsequent rotation of the rotary blade.

First, the cam 45 is fixed to a shaft of the rotary blade 42, and is coaxial with a rotary shaft of the rotary blade 42. In the cam 45, a portion (cam protruding portion 45a) where a distance from a center to a circumference is large is made to substantially coincide with an approximately ⅙ rotating portion where the blade exists on the circumference of the rotary blade 42. An arm 46 that moves while abutting the cam 45 may or may not be in contact with the cam, depending on the position of the cam when the upper unit 5 is closed, to thereby act or not to act in a direction of energizing the protruding portion 44b of the fixed blade control arm 44. Note that to a tip end portion of the arm 46, a rotary bearing 48 is added to assist smooth sliding movement with the cam 45.

In addition, the spring 47 acts on the arm 46 in a direction that allows a tip end portion (abutting portion 49), opposite to the tip end portion of the arm 46, to which the rotary bearing 48 added, to abut against the protruding portion 44b of the fixed blade control arm 44 fixed to the fixed blade 41. However, such an acting force is a force of a level that merely allows the tip abutting portion 49 of the arm 46 to abut the protruding portion 44b when the arm 46 does not abut against the cam 45, and is set to be very small compared with a force to allow the fixed blade 41 to be in pressure contact with the rotary blade 42.

At the time of closing the upper unit 5, regarding an about ⅚ turn portion without the rotary blade 42, the cam 45 does not press the arm 46, and the arm 46 rotates in a clockwise direction by the spring 47 and the tip end portion opposite to the tip end portion to which the rotary bearing 48 of the arm 46 is added lightly abuts against the protruding portion 44b of the fixed blade control arm 44 fixed to the fixed blade 41.

Along with passage of the laminated object, the rotary blade 42 starts rotation from a predetermined stop position at predetermined timing, and after the laminated object is cut, the rotary blade operates to make one turn from the start and stop at the original predetermined position. At this time, the stepped portion 45b at the rotation leading end of the cam protruding portion 45a of the cam 45 abuts against the rotary bearing 48 at the tip end portion of the arm 46 in an order of FIGS. 12(B), 12(C), and 12(D) in the clockwise direction to operate the arm 46. During this time, the abutting portion 49 of the arm 46 does not strongly act on the protruding portion 44b and does not affect the position of the fixed blade 41. As a result, it does not affect the operation of cutting the laminated object.

In a case where operation of the main body is stopped during cutting of the laminated object due to grounds such as abnormality detection of the main body, when the upper unit 5 is opened in that state and the laminated object in process is removed, and then the upper unit 5 is closed, there is a case where the fixed blade 41 and the rotary blade 42 come into contact with each other so that one of the blades may be damaged, depending on how it is closed.

When the upper unit 5 is opened at a position where the fixed blade 41 and the rotary blade 42 are in contact with each other and then the upper unit 5 is closed, the rotary bearing 48 at the tip end portion of the arm 46 and the cam protruding portion 45a of the cam 45 abut against each other, the abutting portion 49 opposite to the rotary bearing 48 at the tip end portion of the arm 46 acts in a direction of energizing the protruding portion 44b of the fixed blade control arm 44 in the direction b, and the fixed blade 41 is separated from the rotary blade 42, to thereby prevent the fixed blade 41 from striking against the rotary blade 42. This prevents the blades from being damaged (see FIG. 12(E)).

In addition, when the rotary blade 42 is driven after the upper unit 5 is closed, the cam 45 rotates in a clockwise direction in the drawing. When it passes through the cam protruding portion 45a of the cam 45, with respect to the movement of the rotary blade 42 thereafter, it moves in a direction opposite to the direction of separating the fixed blade 41, as illustrated in FIGS. 12(B) to 12(D). Accordingly, separating operation is not performed, and the laminated object can be cut.

Further, by an operation of closing the upper unit 5 and an operation of moving the pressure levers 7 and 7 to predetermined positions, the idle rollers 25a and 25b provided to the film cassette 20 protrude rearward from the film cassette 20 in conjunction therewith. Thereby, the films 21a and 21b passing through the idle rollers 25a and 25b are led by the pressing rollers 31 and 32 from the rear side of the pressing rollers 31 and 32. Therefore, the films 21a and 21b are caught at a larger angle by the pressing rollers 31 and 32, and a larger amount of heat is supplied, which contributes to an improvement in the press-bonding performance.

Hereinafter, a roller extrusion mechanism 60 in which the idle rollers 25a and 25b are extruded from the film cassette 20 into the laminating apparatus 1 will be described.

First, the idle roller 25a, through which the upper film 21a passes, is configured such that both ends thereof are pivotally supported by rear end portions of a pair of roller arms 26a and 26a that are provided inside the cassette frames 27 and 28 on both sides of the film cassette 20 and are movable in a predetermined range.

A front end portion of the roller arm 26a is pivotally supported by a shaft body 62 (although not illustrated in FIGS. 5 to 7) that is movable along a linear slits 61 provided in each of the both cassette frames 27 and 28. For smooth movement of the roller arm 26a, the shaft body 62 that moves along the linear slits 61 of the respective two cassette frames 27 and 28 is provided to the respective two cassette frames 27 and 28.

Further, on outer sides of the two cassette frames 27 and 28, T-shaped arms 63 are provided symmetrically to the two cassette frames 27 and 28. The T-shaped arm 63 is pivotally supported by a shaft 64 of a portion where the two arms overlap, and is freely rotatable about the shaft 64.

A lower end of the T-shaped arm 63 engages with the shaft body 62 and moves in conjunction therewith. Although the shaft body 62 moves on a straight line along the straight slit 61, the T-shaped arm 63 draws a circular arc around the shaft 64. Therefore, an engaging portion of the T-shaped arm 63 with the shaft body 62 is formed as an elongated hole to which the shaft body 62 is inserted to engage with.

An upper front end portion of the T-shaped arm 63 is an abutting portion 65 protruding in a left-right direction, and an upper rear end portion is engaged with a tension spring 66 provided between it and the cassette frame 27 or 28. The T-shaped arm 63 is energized in a clockwise direction on the cassette frame 27 side, and in a counterclockwise direction on the cassette frame 28 side.

An intermediate portion of the roller arm 26a has a pin 67a provided outward. The pin 67a is movable along a curved slit 68a formed in the cassette frames 27 and 28.

Next, the lower idle roller 25b is configured such that both ends thereof are pivotally supported by rear end portions of a pair of roller arms 26b and 26b which are provided inside the cassette frames 27 and 28 on both sides of the film cassette 20 and are movable within a predetermined range. A front end portion of the roller arm 26b is pivotally supported by the shaft body 62 that moves along the linear slit 61, similar to the upper roller arm 26a described above.

An intermediate portion of the roller arm 26b has a pin 67b provided outward. The pin 67b is movable along a curved slit 68b formed in the cassette frames 27 and 28.

The roller extrusion mechanism is configured as described above. In a normal state, the shaft body 62 is positioned at a front end of the linear slit 61 via the T-shaped arm 63 by an energizing force of a tension spring 66. Therefore, the idle rollers 25a and 25b are accommodated inside the film cassette 20 as illustrated in FIGS. 5 to 7.

After the upper unit 5 of the laminating apparatus 1 is opened to accommodate the film cassette 20 in the storage recess portion 6, the films 21a and 21b are pulled out from the upper film holder 23 and the lower film holder 24, respectively, and are set in the apparatus. Then, when the upper unit 5 covers it and closed, and the pressure levers 7 and 7 are moved to the predetermined positions, the abutting portion 65 of the T-shaped arm 63 is pushed downward in the film cassette 20 in a mechanically interlocked manner, although not illustrated.

Along with a turn of the T-shaped arm 63 due to downward movement of the abutting portion 65, the shaft body 62 moves rearward along the linear slit 61. As a result, the roller arms 26a and 26b are delivered backward while keeping the engagement of the pins 67a and 67b with the curved slits 68a and 68b, and the films 21a and 21b are wound around the pressing rollers 31 and 32 at a sufficient angle in the laminating apparatus 1.

Projection of the idle rollers 25a and 25b into the apparatus is performed by the movement of the pressure levers 7 and 7 as described above. However, it may be performed by means of another method. For example, a structure in which the abutting portion 65 of the T-shaped arm 63 is pushed down by an operation of closing the upper unit 5 is also acceptable.

Further, it is also possible to project the idle rollers 25a and 25b into the apparatus main body 2 by utilizing a force when the film cassette 20 is pushed into the apparatus main body 2 and mounted, within a range where no mechanical interference occurs, and to accommodate the idle rollers 25a and 25b in the film cassette 20 according to an operation of taking out the film cassette 20 from the apparatus main body 2.

Further, the operating mechanism of the roller arms 26a and 26b is not limited to the structure illustrated and described. The mechanism can be changed as appropriate within a scope of the object of the present invention.

Next, a mechanism of loading the films 21a and 21b to the film cassette 20 will be described. The film cassette 20 has a structure in which two upper and lower films 21a and 21b can be loaded. As a method of loading the films 21a and 21b to the film cassette 20, as illustrated in FIG. 8(B), the film 21a or 21b is wound around the film shaft 22 illustrated in FIG. 8(A), to form a cylindrical shape, and the film shaft 22 with the film wound thereon is placed on an upper film holder 23 or a lower film holder 24 at a predetermined position of the film cassette 20.

As a structure of fixing the film shaft 22 to the upper film holder 23 or the lower film holder 24, there are recessed grooves 71 provided at two positions, that is, an inner upper portion of the cassette frame 27 and an inner lower portion of the cassette frame 28 of the film cassette 20, and recessed grooves 72 provided at two positions, that is, an inner lower portion of the cassette frame 27 and an inner upper portion of the cassette frame 28 of the film cassette 20, and both end portions of the film shaft 22 are laid on and fixed to the recessed grooves 71 and the recessed grooves 72, respectively.

As a structure of the film shaft 22, markings 22a and 22b are provided so that the film can be wound at a predetermined position on the film shaft 22.

As the markings 22a and 22b, dented marking 22a having a film width of A4 and A3 and dented markings 22b having a film width of B5 and B4 are provided on the film shaft 22.

The markings 22a and 22b are made into ring-shaped dents by cutting out the surface of the film shaft 22. This is because in a case of protruding markings, when a film for A4 and A3 is wound, it is impossible to finely wind the film due to the protrusions of the markings for B5 and B4.

In addition, at the time of delivering the film, if the film is delivered with great force, the film may be delivered at a speed higher than a laminating process speed and the film may be sagged or wrinkled. To prevent it, end portions 22c and 22d of the film shaft 22 have a diameter larger than a diameter of a portion on which the film is wound so that the area of a flat portion of the end portion is enlarged. Thereby, a sliding area with the film cassette 20 side is increased and a sliding resistance value is increased to improve braking power of the film.

It should be noted that a film has front and rear surfaces, that is, a surface to which heat-soluble glue is fixed and a surface without it. As a surface sandwiching a medium for lamination must be a glue surface, it is necessary to load the film to the film cassette 20 in such a manner that the glue surface of the film is in a predetermined direction.

That is, the films 21a and 21b have directionality when they are loaded to the film cassette 20. In order to prevent inconvenience of loading them in a different direction, the left and right shapes differ from each other so as to prevent the film from being set in an opposite way between the film shaft 22 side and the film cassette 20 side.

Specifically, the end portion 22c and the end portion 22d of the film shaft 22 have the same shape and the same diameter, but the vicinity of the end portion 22d has a large diameter portion 22e having a larger diameter than that of the end portion 22d. With such a structure, although it is attempted to install the film shaft 22 in an opposite direction, it cannot be installed.

Each of the recessed groove 71 and the recessed groove 72 on the film cassette 20 side, which receives each of the end portions 22c and 22d of the film shaft 22, is in a groove shape continuing from a rear side to a center portion of the cassette frame 27 or 28. The end portions 22c and 22d of the film shaft 22 are to be mounted from the rear side of the film cassette 20 along the recessed grooves 71 and 72 in a groove shape.

Note that a vertical dimension of the recessed groove 71 is substantially the same as a diameter of the end portion 22c of the film shaft 22, and has a dimension that the end portion 22c can pass through but the large diameter portion 22e cannot pass through. On the other hand, a vertical dimension of the recessed groove 72 is substantially the same as the diameter of the large diameter portion 22e in the vicinity of the end portion 22d of the film shaft 22, and has a dimension that allows passage of the large diameter portion 22e. In the upper film holder 23 and the lower film holder 24, the recessed groove 71 and the recessed groove 72 are provided such that right and left are reversed.

In the recessed groove 71 and the recessed groove 72 on the side of the cassette frame 27, a plate-shaped body 73 is energized inward by a compression spring 74. The plate-shaped body 73 has a stepped portion that fits a distal end portion of the end portion 22c of the film shaft 22 on the upper film holder 23 side, and a stepped portion that fits a distal end portion of the end portion 22d on the lower film holder 24 side. The plate-shaped body 73 also has a stepped portion that fits a distal end portion of the end portion 22d of the film shaft 22 in the recessed groove 72 (the upper film holder 23 side) provided on the cassette frame 28 side, and a stepped portion that fits a distal end portion of the end portion 22c of the film shaft 22 in the recessed groove 71 (the lower film holder 24 side).

Moreover, on the side of the recessed groove 71 corresponding to the upper film holder 23, a recessed portion that fits the end portion 22c of the film shaft 22 is provided, whereas on the other recessed groove 72 side, a recessed portion that fits 22e in the vicinity of the end portion 22d of the film shaft 22 is provided. Furthermore, on the side of the recessed groove 72 corresponding to the lower film holder 24, a recessed portion that fits 22e in the vicinity of the end portion 22d of the film shaft 22 is provided, and on the other recessed groove 71 side, a recessed portion that fits the end portion 22c of the film shaft 22 is provided. This realizes a structure in which one type of film wound around the film holder 22 in the same direction is used and a glue surface thereof faces a medium to be interposed.

Then, from the end portion 22c side and the end portion 22d side of the installed film shaft 22, the film shaft 22 is pressed by the upper and lower compression springs 74 provided on the cassette frame 27 side, against the other end portion 22d and the end portion 22c. This works as a mechanism of holding the film shaft 22 and preventing slack of the film, because friction at the end portions to which the film shaft 22 is pressed serves as a resistance when the film is delivered.

With the configuration described above, as a method of loading the film to the film cassette 20, the end portion 22c and the end portion 22d having the large diameter portion 22e adjacent thereto, of the film shaft 22 around which the film is wound, are fitted in the recessed grooves 71 and 72 and held. At the same time, as the end portion 22c and the end portion 22d have a larger diameter than that of the shaft main body and have the same shape (end portions have the same area), a stable constant braking force is also applied from left and right. Accordingly, the film cam be loaded very easily, and there is no need to adjust the braking force thereafter.

Further, a mechanism for detecting a type of a film loaded to the film cassette 20 is provided on the film cassette 20 side and the apparatus main body 2 side.

By detecting the type of a film loaded to the film cassette 20, it is possible to achieve an optimum process according to the type of the film by changing conditions for a laminating process such as temperature of the laminating process performed on the apparatus main body 2 side, a speed of the laminating process, and lamination pressure.

A lower portion of a cassette frame 28 in the film cassette 20 has a film identifying unit 80 consisting of four holes. Each of the four holes can be shut by a member, or opened and closed by means of a slide cover or the like. When the film cassette 20 is installed in the main body, a position of each of the holes corresponds to a position of a switch provided to the apparatus main body 2 side, and it is configured that when the hole is shut, the switch is turned on, while when the hole is not shut, the switch is turned off (not turned on).

The on/off operation is detected by a control unit on the apparatus main body 2 side, and in accordance with the detection, control of the main body side is switched by a routine as illustrated in FIG. 13.

As a specific example, there are four types of films to be loaded having thicknesses of 50µ, 80µ, 100µ, and 125µ. Switches S1, S2, S3, and S4 correspond to the respective films. In the film identifying unit 80 on the film cassette 20 side, the holes corresponding to the switches S1, S2, S3, and S4 are shut or opened, respectively.

When the main body side control detects that the switch S1 is on, it is determined that a film of 50µ is loaded, so that control temperature of the laminating process is set to 90° C. Similarly, when it is detected that the switch S2 is turned on, it is determined that a film of 80µ is loaded, so that control for 95° C. is performed. Similarly, it is determined that the switch S3 is for 100µ film and control for 100° C. is performed, and that the switch S4 is for 125µ and control for 105° C. is performed. In this way, control is performed to realize a better laminating process.

Similarly, it is also possible to change the traveling speed of the laminated object instead of temperature control. It is also possible to change both of them in order to obtain a better finish. Furthermore, although not illustrated, there is also a method of obtaining a better finish by changing pressure of the laminating process.

In the above description, a method of controlling the thickness of a film has been described. However, it is obvious that not only the thickness of a film but also a material of a film and a surface property of a film can be controlled in the same manner. Moreover, it is also possible to set four or more conditions according to combinations of on and off of the four switches S1, S2, S3, and S4.

Next, a film detection mechanism will be described with reference to FIGS. 2 to 4. On a lower side of the apparatus main body 2, a bottom surface of the storage recess portion 6 for storing the film cassette 20 is provided with a film detection lever 81 that is constantly energized upward by an appropriate means such as a spring and can be pushed downward.

When the film cassette 20 with the film loaded therein is stored in the storage recess portion 6 of the apparatus main body 2, the film detection lever 81 abuts against the lower side of the cylindrical film 21b in the lower film holder 24 whereby it moves downward. Thus, a film detection sensor, not illustrated, that recognizes a position of the film detection lever 81 recognizes installation of the film cassette 20, and displays the film cassette 20 in the apparatus and permits a laminating operation appropriately.

With this configuration, when the film cassette 20 is not installed and the film detection lever 81 is not pressed down, the film detection sensor recognizes such a state, and displays that the film cassette is not installed and prohibits a laminating process to thereby prevent an erroneous operation of performing a laminating process without a film.

Furthermore, as a laminating process progresses in a state where the film cassette 20 is installed and the film 21b in the film cassette 20 decreases, a tip end position of the film detection lever 81 in contact with the surface of the film 21b also rises. When the remaining amount of the film 21b becomes very small, that is, when the contact position of the film detection lever 81 approaches the surface position of the film shaft 22 in the lower film holder 24, the film detection sensor recognizes such a state, and issues warning indicating that the remaining amount of the film is small or stops the laminating process to thereby prevent an erroneous operation of continuing the laminating process even when the film runs out.

As described above, it is possible to prevent an erroneous operation in the case where the film cassette 20 is not installed and the case where the film runs out even through the film cassette has been installed, by the same processing including a warning indicating no film and stop of operation, with only one film detection lever 81. This leads to cost reduction of the apparatus due to reduction of the number of components and simplification.

In addition, since an end point of the film in the laminating process can be detected without special processing on the film side, it is also easy to load the film to the cassette at a low cost even in this respect.

It should be noted that it is only detected that the lower film runs out in this example. However, as the upper and lower films are used as a set, by changing both upper and lower films at the same time when it is detected that the lower film runs out, it is possible to prevent a problem of using only one film. Moreover, it is also possible to produce an apparatus at low cost.

REFERENCE SIGNS LIST

1 laminating apparatus
2 apparatus main body
3 sheet feed tray
4 output tray
5 upper unit
6 storage recess portion
7 pressure lever
10 sheet feed mechanism unit
11 draw-in roller
12 upper sheet feed roller
13 lower separation roller
14, 15 conveyance roller
20 cassette
21a, 21b film
22 film shaft
23 upper film holder
24 lower film holder
25a, 25b idle roller
26a, 26b roller arm
27, 28 cassette frame
29 crossbar
30 press-bonding mechanism unit
31, 32 pressing roller
33, 34 pull roller
35 fan
40 rotary cutter unit
41 fixed blade
41a fulcrum
42 rotary blade
43 cam
43a cam recess portion
44 fixed blade control arm
44b protruding portion
45 cam
45a cam projection
45b cam step
46 arm
47 spring
48 rotary bearing
49 abutting portion
50 discharge unit
51, 52 discharge roller
60 roller extrusion mechanism
61 linear slit
62 shaft body
63 T-shape arm
64 axis
65 abutting portion
66 tension spring
67a, 67b pin
68a, 68b curved slit
71, 72 recessed groove
73 plate-shaped body
74 compression spring
80 film identifying unit
81 film detection lever

The invention claimed is:

1. A laminating apparatus comprising:
a sheet feed mechanism unit configured to convey a sheet to be laminated into an apparatus main body;
a film cassette in which a pair of films for lamination is accommodated, the film cassette being detachable from the apparatus main body; and
a press-bonding mechanism unit configured to perform a laminating process through thermal press bonding while sandwiching the sheet with the pair of films delivered from the cassette in the apparatus main body, wherein
the apparatus main body includes an upper unit of an openable and closable type, and
the upper unit is provided with one pressing roller of a pair of pressing rollers for press-bonding in the press-bonding mechanism unit, and an upper member of another mechanism for performing a process in a state where upper and lower sides of the sheet is sandwiched between the pair of films.

2. The laminating apparatus according to claim 1, wherein
in the film cassette, a film is wound around a pair of film shafts pivotally supported in a rotatable manner at upper and lower positions across a conveying path of the sheet when the film cassette is installed in the apparatus main body, and
the film cassette is installed by being fitted downward from above the apparatus main body.

3. The laminating apparatus according to claim 2, wherein the film cassette includes a pair of idle rollers projectable and retractable in an up and down direction of the press-bonding mechanism unit in the apparatus main body from a side of the film shaft.

4. The laminating apparatus according to claim 3, wherein
each of the pair of idle rollers is pivotally supported by end portions of a pair of roller arms, and
when the film cassette is installed in the apparatus main body, one ends of the roller arms are projectable and retractable from an inside of the film cassette into the apparatus main body.

5. The laminating apparatus according to claim 4, wherein the pair of idle rollers protrudes according to an operation of closing the upper unit, and retracts according to an operation of opening the upper unit.

6. The laminating apparatus according to claim 4, wherein after the upper unit is closed, the pair of idle rollers protrudes according to an operation of a pressure lever to apply pressure to the press-bonding mechanism unit, and retracts according to an operation of releasing the pressure lever.

7. The laminating apparatus according to claim 1, further comprising:
a rotary cutter unit provided behind the press-bonding mechanism unit, the rotary cutter unit being configured to sandwich a sheet, to which the laminating process is applied, between a fixed blade and a rotary blade and cut the sheet in a width direction; and
a mechanism configured to, when the rotary blade is located at a rotary position at which the rotary blade abuts the fixed blade at a time of closing a cover of an openable and closable type, separate positions of the rotary blade and the fixed blade from each other, and when the rotary blade rotates in a state where the cover of the openable and closable type is closed, return the rotary blade and the fixed blade to original positions.

8. The laminating apparatus according to claim 1, wherein a speed of a conveyance roller that conveys the sheet while sandwiching the sheet in the sheet feed mechanism unit is switched between two speeds including a high speed and a low speed, so that a space between a preceding sheet and a subsequent sheet is made constant.

9. The laminating apparatus according to claim 1, further comprising a film identifying unit capable of being set to an appropriate state according to a type and size of a film loaded to the film cassette, wherein
a state of the film identifying unit is recognized by the apparatus main body and a laminating process is performed according to the type and size of the film.

10. The laminating apparatus according to claim 1, further comprising a film detection sensor provided to the apparatus main body, the film detection sensor being energized to be brought into contact with a surface of a film wound around the film shaft in the film cassette installed in the apparatus main body to detect a position of the surface of the film, wherein
a remaining amount of the film is detected by the film detection sensor.

11. The laminating apparatus according to claim 10, wherein the film detection sensor also serves to detect whether or not the film cassette is installed.

12. A film shaft that holds a film for lamination, the film being wound directly on the film shaft, to supply the film to a laminating apparatus,
wherein an end portion of the film shaft has a diameter larger than a diameter of a shaft portion, and a shape of the film shaft in a vicinity of a first end of the film shaft and a shape of the film shaft in a vicinity of a second end of the film shaft that is opposite to the first end are different from each other, and
wherein a surface of the film shaft has markings in a dented shape, the markings being provided at intervals corresponding to widths of different paper sizes.

* * * * *